No. 608,828. Patented Aug. 9, 1898.
C. N. BRADY.
APPARATUS FOR MAKING ARTICLES OF GLASSWARE.
(Application filed June 1, 1897.)

(No Model.)

Witnesses.

Inventor.
Charles N. Brady
by
Frank L. Dyer
Attorney.

UNITED STATES PATENT OFFICE.

CHARLES N. BRADY, OF WASHINGTON, PENNSYLVANIA.

APPARATUS FOR MAKING ARTICLES OF GLASSWARE.

SPECIFICATION forming part of Letters Patent No. 608,828, dated August 9, 1898.

Application filed June 1, 1897. Serial No. 638,963. (No model.)

*To all whom it may concern:*

Be it known that I, CHARLES N. BRADY, a citizen of the United States, residing at Washington, in the county of Washington and State of Pennsylvania, have invented certain new and useful Improvements in Apparatus for Making Articles of Glassware; and I do hereby declare the following to be a full, clear, and exact description of the invention, which will enable others skilled in the art to which it appertains to make and use the same.

My invention relates to an improved apparatus for making articles of glassware, and particularly glass vessels, such as fruit-jars, bottles, &c. The apparatus can be used economically by ordinary workmen, and the results obtained, even when difficult and intricate work is to be done, are excellent.

Figure 1:
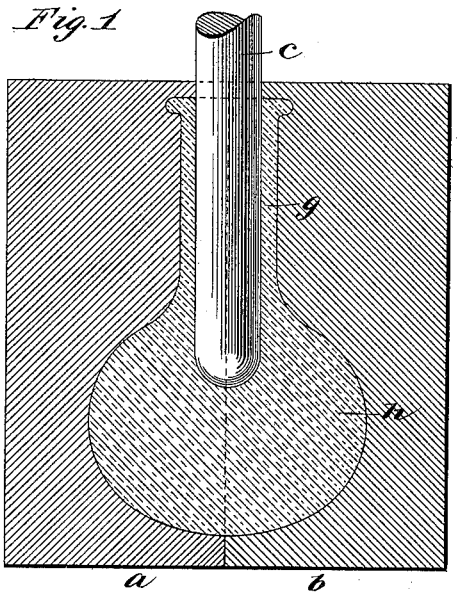
Figure 2:
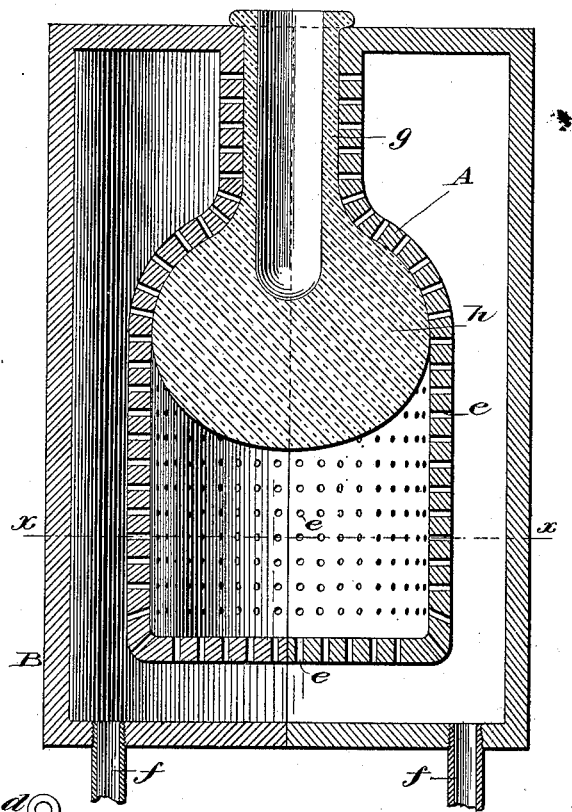

In the accompanying drawings, Figure 1 is a sectional view of an ordinary form of mold, in which the neck of the article may be pressed; Fig. 2, a sectional view of my improved mold, in which the body of the article is formed; and Fig. 3, a cross-sectional view of Fig. 2.

In the above views corresponding parts are designated by the same letters of reference.

The mold shown in Fig. 1 is of a well-known construction, being made of two parts $a$ and $b$, hinged together, and being so formed as to enable the neck and mouth of the article to be pressed therein, with an attached bloom. A plunger $c$ presses the neck, being operated in any suitable way.

Figure 3:
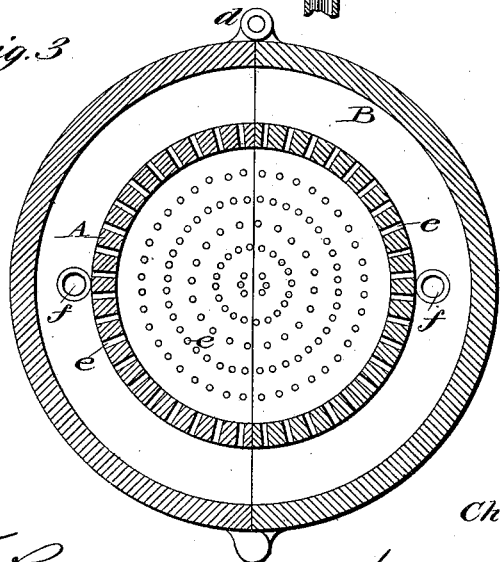

The mold illustrated in Figs. 2 and 3 is of novel construction. A is the mold proper, of the shape of the finished article. The neck of this mold A is of the same size as the neck of the article which is formed in the press-mold. The mold A is surrounded both at the sides and bottom by a heavy casing B and may be either integral therewith or attached thereto in any desired way. Both the mold A and its casing B are made in two parts hinged together, as at $d$, and adapted to be locked in any suitable way when closed. The mold A is provided with a great number of small perforations $e\ e$, extending entirely through its walls below the neck thereof. Extending out from the casing B, such as from the bottom thereof, as in Fig. 2, is a pipe or pipes $f$. These latter pipes connect with a suitable source of vacuum-supply, such as a vacuum-pump.

In making articles of glass with such an apparatus I proceed substantially as follows: A sufficient quantity of glass is deposited within the press-mold and the plunger is forced down therein, forming the neck $g$ of the article, with the depending bloom $h$. The press-mold is then opened and the partially-finished article is removed. If the glass is plastic enough to be blown, it is placed immediately in the mold A; but if not then the bloom $h$ is suitably reheated before being placed in said mold. The mold A and casing B are now closed, care being taken that all joints should be as tight as possible, and the pipe or pipes $f$ are immediately connected with the vacuum-supply. The air will thus be exhausted from the space inside of the casing B, including the space inside of the mold A, by reason of the perforations therein. Atmospheric pressure will then expand the bloom $h$ into the mold A and the article will be finished. Since a pressure of only about two pounds per square inch will be required for this purpose, it will be seen that a vacuum of only about four inches will be necessary. Such a vacuum can be easily produced by any good vacuum-pump.

It is evident that a partial vacuum may be supplied to the molds A in other ways than that described, such as by introducing steam within the said mold and allowing such steam to condense.

Having now described my invention, what I claim as new therein, and desire to secure by Letters Patent, is as follows:

1. An improved apparatus for making glass articles, consisting of a perforated mold, an air-tight casing surrounding the same and connected therewith, and a vacuum-pipe connected with said casing, substantially as set forth.

2. An improved apparatus for making glass articles, consisting of a divided perforated mold, an air-tight casing surrounding the same and connected therewith, and a vacuum-pipe connected with said casing, substantially as set forth.

3. An improved apparatus for making glass articles, consisting of the divided, perforated mold A, and a divided air-tight casing B, surrounding the same and connected therewith, and a pipe $f$, connected with a source of vacuum, substantially as set forth.

This specification signed and witnessed this 25th day of March, 1897.

CHARLES N. BRADY.

Witnesses:
MINNIE A. LEONARD,
N. R. BAKER.